United States Patent
Liu

(10) Patent No.: US 7,599,562 B2
(45) Date of Patent: Oct. 6, 2009

(54) METHOD FOR TRANSMITTING DATA BETWEEN DIFFERENT COMPUTERS

(75) Inventor: Wei-Hung Liu, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 690 days.

(21) Appl. No.: 11/277,520

(22) Filed: Mar. 27, 2006

(65) Prior Publication Data

US 2007/0165912 A1   Jul. 19, 2007

(30) Foreign Application Priority Data

Dec. 20, 2005  (TW)  ............................ 94145295 A

(51) Int. Cl.
G06K 9/68  (2006.01)
G06K 9/22  (2006.01)
G06F 7/04  (2006.01)
G06F 3/033  (2006.01)

(52) U.S. Cl. ........................ 382/218; 382/314; 340/5.2; 345/179

(58) Field of Classification Search ................ 382/100, 382/186, 188–189, 305–306, 309, 311, 313, 382/115, 120, 209, 218, 314; 345/156, 169, 345/179; 340/5.2, 5.81

See application file for complete search history.

(56) References Cited

U.S. PATENT DOCUMENTS

| 5,579,481 | A | 11/1996 | Drerup |
| 5,924,099 | A * | 7/1999 | Guzak et al. ................. 707/100 |
| 6,563,494 | B1 * | 5/2003 | Eichstaedt et al. .......... 345/179 |
| 2005/0025078 | A1 | 2/2005 | Hwang |
| 2005/0283482 | A1 * | 12/2005 | Lai .............................. 707/10 |
| 2006/0192772 | A1 * | 8/2006 | Kambayashi ................ 345/179 |

FOREIGN PATENT DOCUMENTS

| CN | 1282898 A | 2/2001 |
| CN | 1578282 A | 2/2005 |

* cited by examiner

*Primary Examiner*—Daniel G Mariam
(74) *Attorney, Agent, or Firm*—Winston Hsu

(57) ABSTRACT

Transmitting data between different computers includes selecting data stores in a first computer with a stylus, generating a transmission identification code corresponding to the data selected, transmitting the transmission identification code generated from the first computer to the stylus, transmitting the transmission identification code from the stylus to a second computer, and transmitting the data selected with the stylus from the first computer to the second computer in accordance with the transmission identification code.

19 Claims, 2 Drawing Sheets

METHOD FOR TRANSMITTING DATA BETWEEN DIFFERENT COMPUTERS

BACKGROUND OF THE INVENTION

1. Field of the Invention

The present invention provides a method of transferring data between different computers, and particularly, a method of transferring data by transferring a transmission identification code corresponding to the data to be transferred through a stylus to achieve data transfer between different tablet computers.

2. Description of the Prior Art

Apart from the physical difference, the biggest difference between a tablet computer and an ordinary laptop is that a tablet computer takes hand-written format as its input and it has a rotating display screen. At the moment, in comparison to other markets, tablet computers are obviously more commonly distributed in certain markets, including medicine, education, banking, insurance and real estate agency, etc. However, even though tablet computers have been on the market for sale for a period of time, they still have disadvantages like the operational inconvenience of the human interface. Thus, consumers cannot yet broadly accept tablet computers. For example, the stylus of a conventional tablet computer can only operate on the computer that it is attached to or activated on. On this operating computer, the user is able to select objects or files with the stylus, and then click the copy or cut functions of the selected files. At this time, the system gives the selected files or objects a handle, and after that the user move the stylus to the target window to perform focusing before clicking on a paste instruction. The system withdraws the handle recorded and converts it to a corresponding object type, and then executes the paste action. The conventional stylus can only perform cut, copy and paste functions on files or objects within a single machine. When copying or moving files or objects across machines, searching another machine with a wireless connection through network space must be performed before acting on copying or moving the files to the other machine. Therefore, it loses the convenience of using handwriting to control a system in a tablet computer; it also loses the easily controlled human interface advantage of a tablet computer over an ordinary laptop.

SUMMARY OF THE INVENTION

According to the claimed invention, the method of transferring files between different computers comprises selecting data to be transferred on a first computer with a stylus; generating a transmission identification code according to the selected data; transferring the transmission identification code from the first computer to the stylus; transferring the transmission identification code from the stylus to a second computer; and the second computer obtaining the data from the first computer according to the transmission identification code.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
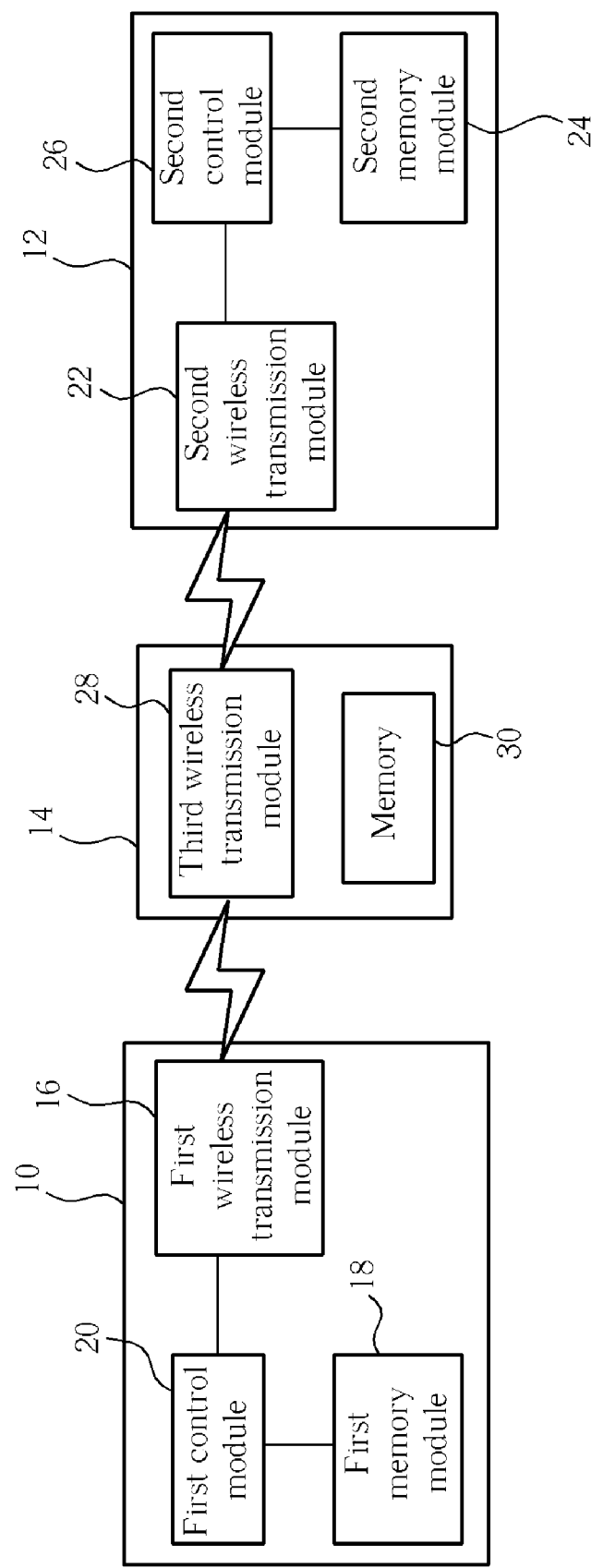
FIG. 1 is a block diagram of a method of transferring files between a first computer and a second computer through a stylus according to the present invention.

Please refer to FIG. 1. FIG. 1 is a block diagram of a method of transferring files between a first computer 10 and a second computer 12 through a stylus 14 according to the present invention. The first computer 10 and the second computer 12 are tablet computers. The first computer 10 comprises a first wireless transmission module 16 for transmitting data in a wireless manner, a first memory module 18 for storing data, and a first control module 20 coupled to the first wireless transmission module 16 and the first memory module 18 for controlling the operation of the first computer 10. The second computer 12 comprises a second wireless transmission module 22 for transmitting data in a wireless manner, a second memory module 24 for storing data, and a second control module 26 coupled to the second wireless transmission module 22 and the second memory module 24 for controlling the operation of the second computer 12. The stylus 14 comprises a third wireless transmission module 28 for transmitting data in a wireless manner and a memory 30 for storing data.

Figure 2:
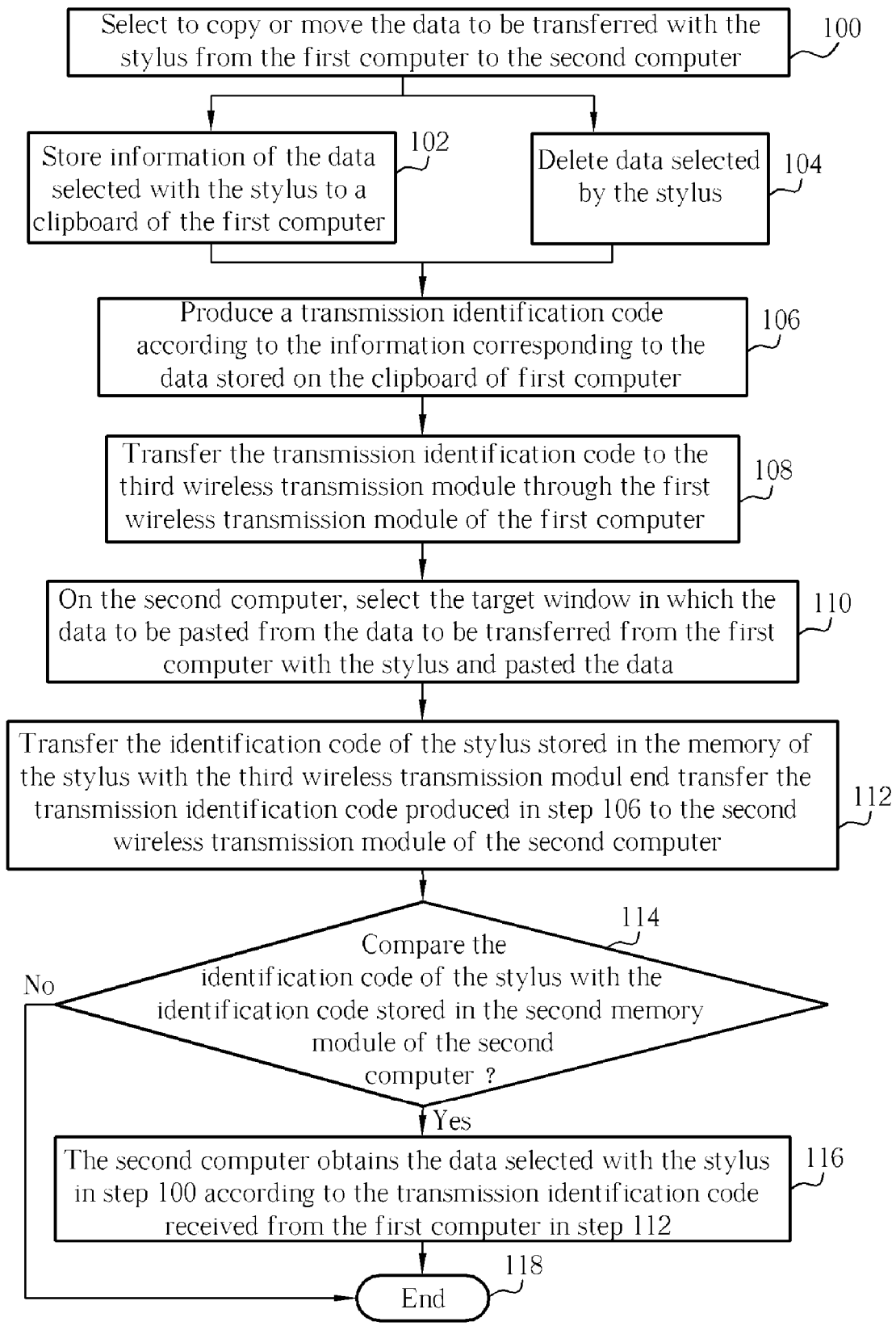
FIG. 2 is a flow chart of file transfer between the first computer and the second computer with the stylus of FIG. 1.

Please refer to FIG. 2. FIG. 2 is a flow chart of file transfer between the first computer 10 and the second computer 12 with the stylus 14. The steps are as follows:

Step 100: select to copy or move the data to be transferred with the stylus 14 from the first computer 10 to the second computer 12. If copying data is selected, go to step 102; if moving data is selected, go to step 104;

Step 102: store information of the data selected with the stylus 14 to a clipboard of the first computer 10;

Step 104: delete data selected by the stylus 14;

Step 106: produce a transmission identification code according to the information corresponding to the data stored on the clipboard of first computer 10;

Step 108: transfer the transmission identification code to the third wireless transmission module 28 through the first wireless transmission module 16 of the first computer 10;

Step 110: on the second computer 12, select the target window in which the data to be pasted from the data to be transferred from the first computer 10 with the stylus 14, and paste the data;

Step 112: transfer the identification code of the stylus 14 stored in the memory 30 of the stylus 14 with the third wireless transmission module 28 and transfer the transmission identification code produced in step 106 to the second wireless transmission module 22 of the second computer 12;

Step 114: compare the identification code of the stylus 14 with the identification code stored in the second memory module 24 of the second computer 12. If the identification code of the stylus 14 matches the identification code stored in the second memory module 24 of the second computer 12, go to step 116; if not, go to step 118;

Step 116: the second computer 12 obtains the data selected with the stylus 14 in step 100 according to the transmission identification code received from the first computer 10 in step 112;

Step 118: end.

The following is the detailed description of the steps above. First the user selects data to be copied or moved from the first computer 10 to the second computer 12 with the stylus 14. The data can be text, graphics, Object Linking and Embedding (OLE) objects, files, folders, etc. If copying data is selected with the stylus 14, the operating system of the first computer 10 will store the corresponding information of the data selected with the stylus to a clipboard of the first computer 10. For example, if the data is a text section of the text data, graphical data, or OLE data highlighted with the stylus 14, the operating system of the first computer 10 will store the corresponding information of the data (for instance, the data and its memory block address information) in the format of clipboard objects to the clipboard of the first computer 10; and if the data is a file or a folder, the operating system of the first computer 10 will store the address information of the data in the format of a clipboard object to the clipboard of the first computer 10. In addition, if the stylus 14 selects the data to be moved, the operating system of the first computer 10 will store the corresponding information of the data selected with the stylus 14 to the clipboard of the first computer 10 and delete the data selected with the stylus instantaneously.

Thereafter, the first control module 20 of the first computer 10 produces a transmission identification code according to the corresponding information of the data stored on the clipboard of the first computer 10. According to the description above, if the data is text, graphics or OLE data, the first control module 20 will generate a transmission identification code comprising address information of the first computer 10 and corresponding information of the data. The address information of the first computer 10 can be an Internet Protocol (IP) address. If the data is a file or folder, the first control module 20 will generate a transmission identification code comprising address information of the first computer 10 and the directory path of the data in the first computer 10 according to the corresponding information stored on the clipboard of the first computer 10. Besides, the transmission identification code generated by the first control module 20 comprises transition time information. This means that after the first computer 10 transfers the transmission identification code to the stylus 14, if the time of the transmission identification code stored in the stylus 14 exceeds the transition time, the transmission identification code stored in the stylus 14 will be expired. This prevents the users from copying or moving data from the first computer 10 and forgetting to paste it to the second computer 12, and afterward mistakenly pasting the data to the second computer 12.

The first control module 20, after generating the transmission identification code, will control the first wireless transmission module 16 to transmit the transmission identification code to the third wireless transmission module 28 of the stylus 14. The first wireless transmission module 16 transferring the transmission identification code to the third wireless transmission module 28 of the stylus 14 can use wireless transmission techniques, such as Bluetooth, Radio Frequency Identification (RFID), etc. The stylus 14 then temporarily stores the transmission identification code in the memory 30. Subsequently, the user can use the stylus 14 to select the target window on the second computer 12 for pasting the data to be transferred from the first computer 10 (for example, to paste text, graphics, or OLE data), or to paste files or a directory of a folder. Then the stylus 14 pastes the data. The third wireless transmission module 28 of the stylus 14 transmits the identification code of the stylus 14 stored in the memory 30 of the stylus 14 and the transmission identification code to the second wireless transmission module 22 of the second computer 12. The third wireless transmission module 28 transmitting the identification code of the stylus 14 and the transmission identification code to the second wireless transmission module 22 can use wireless transmission techniques, such as Bluetooth, RFID, etc. After receiving the identification code of the stylus 14, the second control module 26 of the second computer 12 will compare the identification code of the stylus 14 with a pre-stored identification code in the second memory module 24, in order to determine whether the stylus to be connected is a certified stylus. If the identification code of the stylus 14 matches the pre-stored identification code in the second memory module 24, pasting to the second computer 12 is then allowed to proceed. On the other hand, if the identification code of the stylus 14 does not match the pre-stored identification code in the second memory module 24, no data is allowed to be written to the second computer 12.

Finally, if the identification code of the stylus 14 matches the pre-stored identification code in the second memory module 24, the second computer 12 is able to obtain the data selected by the stylus 14 from the first computer 10, as described in step 100, according to the transmission identification code received from the second wireless transmission module 22.

According to the above description, if the data is text, graphics or OLE data, the second control module 26 of the second computer 12 (including a stylus driver) according to the decoded transmission identification code can obtain a computer network address of the source (the IP address of the first computer 10), the object type of the source (text, graphics, or OLE data and address information of the memory block, etc) and the transition time. The second computer 12 is therefore able to obtain the data selected by the stylus 14 from the first computer 10 according to the decoded information through a physical network (wireless or wired), and stores the data on a clipboard of the second computer 12. The subsequent actions follow the regulations of operating systems, and they are executing the program code for pasting and storing the data of the clipboard of the second computer 12 on a window of the second computer 12 selected by the stylus 14, such as specified document window. If the data is a file or a folder, the second control module 26 of the second computer 12 (including the stylus driver) according to the decoded transmission identification code can obtain a computer network address of the source (the IP address of the first computer 10) and the directory path in the first computer 10 of the data and the transition time. The second computer 12 is therefore able to obtain the data selected by the stylus 14 from the first computer 10 according to the decoded information through a physical network (wireless or wired). The subsequent actions follow the regulations of operating systems, and they are executing the program code for pasting and storing the data of the clipboard of the second computer 12 in a window of the second computer 12 selected by the stylus 14, such as under a directory.

If the present invention does not require the stylus 14 to be the medium of transferring data between the first computer 10 and the second computer 12 through transferring and transmitting the transmission identification code, the linkage between the stylus 14 and the first computer 10 or the second computer 12 can be cancelled. For instance, from changing the pre-stored identification code in the second memory module 24 of the second computer 12, the following transmission cannot be completed due to the mismatch between the identification code of the stylus 14 and the changed identification code in the second memory module 24.

In comparison with the conventional methods of data transfer between different tablet computers, the present invention achieves preserving the habit of transferring data with a stylus on a tablet computer while transferring data between different tablet computers. This means that copying or moving files from one computer to another has the same operations as copying, cutting, and pasting on one computer. Thus, the convenience of hand-controlled systems of tablet computers is increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transferring data between different computers comprising:
   selecting data to be transferred on a first computer with a stylus;
   generating an identification code according to the selected data;
   transferring the identification code from the first computer to the stylus;
   transferring the identification code from the stylus to a second computer;
   comparing the identification code of the stylus to an identification code stored on the second computer and determining if the identification code of the stylus is authorized for use on the second computer; and
   the second computer obtaining the data from the first computer according to the identification code upon determining the identification code of the stylus is authorized for use on the second computer.

2. The method of claim 1 wherein selecting the data to be transferred on the first computer with the stylus comprises selecting the data to be copied on the first computer with the stylus, the method further comprising storing information corresponding to the selected data in a clipboard of the first computer.

3. The method of claim 1 wherein selecting the data to be transferred on the first computer with the stylus comprises selecting the data to be cut on the first computer with the stylus, the method further comprising storing information corresponding to the selected data in a clipboard of the first computer and deleting the selected data from the first computer.

4. The method of claim 1 further comprising:
   storing information corresponding to the selected data to a clipboard of the first computer;
   wherein generating the identification code according to the selected data is generating the transmission identification code according to the information stored in the clipboard of the first computer.

5. The method of claim 4 wherein generating the transmission identification code according to the information stored in the clipboard of the first computer is generating the transmission identification code including address information of the first computer and address information of the selected data in the first computer according to the information stored in the clipboard of the first computer.

6. The method of claim 5 wherein generating the transmission identification code including the address information of the first computer and the address information of the selected data in the first computer according to the information stored in the clipboard of the first computer is generating the transmission identification code including an Internet Protocol address of the first computer and the address information of the selected data in the first computer according to the information stored in the clipboard of the first computer.

7. The method of claim 1 wherein selecting the data to be transferred on the first computer with the stylus is selecting a file to be transferred on the first computer with the stylus.

8. The method of claim 1 wherein selecting the data to be transferred on the first computer with the stylus is selecting a folder to be transferred on the first computer with the stylus.

9. The method of claim 1 wherein selecting the data to be transferred on the first computer with the stylus is selecting text data to be transferred on the first computer with the stylus.

10. The method of claim 1 wherein selecting the data to be transferred on the first computer with the stylus is selecting graphical data to be transferred on the first computer with the stylus.

11. The method of claim 1 wherein selecting the data to be transferred on the first computer with the stylus is selecting Object Linking and Embedding (OLE) data to be transferred on the first computer with the stylus.

12. The method of claim 1 wherein the second computer obtaining the data from the first computer according to the identification code comprises storing the data on a clipboard of the second computer.

13. The method of claim 1 wherein the second computer obtaining the data from the first computer according to the identification code comprises storing the data on a window of the second computer selected by the stylus.

14. The method of claim 1 wherein transferring the identification code from the first computer to the stylus is transferring the identification code from the first computer to the stylus in a wireless manner.

15. The method of claim 14 wherein transferring the identification code from the first computer to the stylus in the wireless manner is transferring the identification code from the first computer to the stylus with a Bluetooth technology.

16. The method of claim 14 wherein transferring the identification code from the first computer to the stylus in the wireless manner is transferring the transmission identification code from the first computer to the stylus with a Radio Frequency Identification (RFID) technology.

17. The method of claim 1 wherein transferring the identification code from the stylus to the second computer is transferring the identification code from the stylus to the second computer in a wireless manner.

18. The method of claim 17 wherein transferring the identification code from the stylus to the second computer in the wireless manner is transferring the identification code from the stylus to the second computer with a Bluetooth technology.

19. The method of claim 17 wherein transferring the identification code from the stylus to the second computer in the wireless manner is transferring the transmission identification code from the stylus to the second computer with a Radio Frequency Identification (RFID) technology.

* * * * *